(12) United States Patent
Nelson

(10) Patent No.: US 10,525,848 B2
(45) Date of Patent: Jan. 7, 2020

(54) VEHICLE CHARGING LANES

(71) Applicant: HERE Global B.V., Eindhoven (NL)

(72) Inventor: Scott David Nelson, Grand Haven, MI (US)

(73) Assignee: HERE Global B.V., Eindhoven (NL)

( * ) Notice: Subject to any disclaimer, the term of this patent is extended or adjusted under 35 U.S.C. 154(b) by 491 days.

(21) Appl. No.: 15/226,401

(22) Filed: Aug. 2, 2016

(65) Prior Publication Data

US 2018/0037136 A1 Feb. 8, 2018

(51) Int. Cl.
*B60M 3/04* (2006.01)
*B60L 5/00* (2006.01)
(Continued)

(52) U.S. Cl.
CPC .............. *B60M 3/04* (2013.01); *B60L 5/005* (2013.01); *B60L 5/38* (2013.01); *B60L 50/53* (2019.02); *B60L 53/12* (2019.02); *B60L 53/51* (2019.02); *B60L 53/52* (2019.02); *B60L 53/63* (2019.02); *B60L 55/00* (2019.02); *B60L 58/12* (2019.02); *B60L 2240/62* (2013.01);
(Continued)

(58) Field of Classification Search
CPC .............. B60L 11/1801; B60L 11/182; B60L 11/1842; B60L 11/1844; B60L 11/1861; B60L 2230/22; B60L 2230/24; B60L 2240/62; B60L 2240/642; B60L 2240/66; B60L 2240/665; B60L 2240/667; B60L 2240/68; B60L 5/005; B60L 5/38; B60L 11/1846; B60L 11/1829; B60M 3/04; Y02T 90/121; Y02T 90/128; Y02T 90/163; Y02T 90/122; Y02T 90/169; Y02T 10/7291; Y02T 90/162; Y02T 10/72; Y02T 10/7283
See application file for complete search history.

(56) References Cited

U.S. PATENT DOCUMENTS 5,778,326 A * 7/1998 Moroto .................. B60K 6/485
701/22
5,790,976 A * 8/1998 Boll .......................... B60L 3/12
180/65.8
(Continued)

FOREIGN PATENT DOCUMENTS

WO WO2011128235 A1 10/2011
WO WO2013162431 A1 10/2013

OTHER PUBLICATIONS

PCT International Search Report and Written Opinion of the International Searching Authority dated Oct. 16, 2017 for corresponding PCT/US2017/042714.
(Continued)

*Primary Examiner* — Mark T Le
(74) *Attorney, Agent, or Firm* — Lempia Summerfield Katz LLC

(57) ABSTRACT

Embodiments include apparatus and methods for implementing lane charging for a roadway. A road segment in a geographic region is identified from a geographic database. The road segment may be identified based on the geographic position of a vehicle. A lane charging management device receives real time data related to the vehicle, the environment, or the electricity associated with the charging station. A lane charging command for a charging device associated with the road segment is generated in response to the real time data.

20 Claims, 13 Drawing Sheets

(51) Int. Cl.
  *B60L 5/38* (2006.01)
  *B60L 50/53* (2019.01)
  *B60L 53/12* (2019.01)
  *B60L 55/00* (2019.01)
  *B60L 53/63* (2019.01)
  *B60L 58/12* (2019.01)
  *B60L 53/51* (2019.01)
  *B60L 53/52* (2019.01)

(52) U.S. Cl.
  CPC ..... *B60L 2240/642* (2013.01); *B60L 2240/66* (2013.01); *B60L 2240/665* (2013.01); *B60L 2240/667* (2013.01); *B60L 2240/68* (2013.01); *Y02E 60/721* (2013.01); *Y02T 10/7005* (2013.01); *Y02T 10/7088* (2013.01); *Y02T 10/7291* (2013.01); *Y02T 90/121* (2013.01); *Y02T 90/122* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | |
|---|---|---|
| 6,421,600 B1 | 7/2002 | Ross |
| 8,725,331 B2 | 5/2014 | Yoshida |
| 9,091,563 B2 | 7/2015 | Seino |
| 9,643,511 B2* | 5/2017 | Jeon .................... B60L 11/1861 |
| 2008/0265684 A1 | 10/2008 | Farkas |
| 2010/0094496 A1 | 4/2010 | Hershkovitz et al. |
| 2011/0285349 A1 | 11/2011 | Widmer et al. |
| 2012/0012406 A1 | 1/2012 | Stoicoviciu |
| 2013/0029595 A1 | 1/2013 | Widmer et al. |
| 2013/0035823 A1 | 2/2013 | Yoshida |
| 2013/0282472 A1 | 10/2013 | Penilla et al. |
| 2014/0021908 A1 | 1/2014 | McCool et al. |
| 2014/0055090 A1 | 2/2014 | Krause |
| 2014/0125286 A1 | 5/2014 | Cho et al. |
| 2015/0324798 A1 | 11/2015 | Kai et al. |
| 2016/0036917 A1 | 2/2016 | Koravadi et al. |
| 2016/0265929 A1* | 9/2016 | Kitajima ............ G01C 21/3469 |
| 2016/0325637 A1* | 11/2016 | Payne ................ G01C 21/3469 |
| 2017/0088000 A1* | 3/2017 | Payne ................ B60L 11/1838 |
| 2017/0120761 A1* | 5/2017 | Kapadia ................ B60L 11/184 |

OTHER PUBLICATIONS

Bayless, Steven H., Radha Neelakantan, and Adrian Guan. "Connected Vehicle Assessment: Vehicle Electrification and the Smart Grid: The Supporting Role of Safety and Mobility Services." (2012).

* cited by examiner

US 10,525,848 B2

VEHICLE CHARGING LANES

FIELD

The following disclosure relates to control of one or more charging lanes for charging an electric vehicle and/or control of one or more electric vehicles or an associated device with respect to the one or more charging lanes.

BACKGROUND

An electric vehicle is a vehicle that includes an electric propulsion system. The electric propulsion system may include an electric motor and a battery. Hybrid vehicles may also include a combustion engine as well as a regenerative power system that transfers excess power from the combustion engine to the electric propulsion system.

Electric vehicles may be charged by a charging station. The charging systems may be placed in parking garages, parking lots, or consumer homes. The electric vehicle may be electrically coupled to the charging station using a cord. Depending on the electrical input to the charging system, which may vary in amplitude and in number of phases, different charging stations may be capable of charging the electric vehicle in different amounts of time.

Inductive charging systems may be developed in which no cord between the charging station and the electric vehicle is necessary. For example, inductive charging systems may be imbedded in the ground (e.g., concrete or asphalt) below a parking spot in a garage or parking lot. Electricity flowing through the inductive charging system may inductively charge a battery in the electric vehicle. Inductive charging system may also be imbedded in roadways and charge electric vehicles while the vehicles are traveling on the roadways. Charging systems in roadways are a scarce resource that can be managed in order to benefit a maximum number of electric vehicles.

SUMMARY

In one embodiment, a method for implementing lane charging for a roadway. A road segment in a geographic region is identified. A lane charging management device receives real time data and generates a lane charging command for a charging device associated with the road segment in response to the real time data.

In another embodiment, an apparatus for implementing lane charging for a roadway includes a geographic database, a communication interface, and a lane charging management controller. The geographic database includes data indicative of a plurality of road segments in a geographic region. The communication interface is configured to receive real time data for at least one of the road segments in geographic region. The lane charging management controller is configured to generate a lane charging command for a charging device associated with the at least one of the road segments in response to the real time data.

In another embodiment, a system for implementing lane charging for a roadway includes a charging device, a geographic database, and a lane charging management device. The charging device is integrated with a road surface. The geographic database includes data indicative of a plurality of road segments in a geographic region, including a road segment associated with the road surface of the charging device. The lane charging management device configured to receive real time data for at least one of the road segments in the geographic region and generate a lane charging command for the charging device associated with the road segment in response to the real time data.

BRIEF DESCRIPTION OF THE DRAWINGS

Exemplary embodiments of the present invention are described herein with reference to the following drawings.

DETAILED DESCRIPTION

Inductive charging units or magnetic charging units may be imbedded in roadways. For a variety of reasons, charging may be limited to a single lane or less than the total number of lanes in the roadway. One reason is cost. If most of the electric vehicles with lane charging capabilities can be serviced by one or few lanes, planners may prefer to limit the amount of charging lanes in a multilane roadway. Another reason is tolling. The charging electric vehicles may incur a toll or an additional toll, which is achieved through separate charging lanes. The toll may be associated with the infrastructure or the ongoing operational requirements or costs for the charging lanes.

In addition, when charging lanes go unused, or used minimally, power is wasted. Even when inductive charging units are not charging electric vehicles, energy is lost through heat. The most efficient power management is achieved when the charging system just meets the requirements of the system. The requirements of the system may include the demands of the electric vehicles traveling on the roadway, or the energy required by the electric vehicles to reach the destinations of the electric vehicles. In addition, there is an optimal number of vehicles traveling on the charging lanes given the abilities of the charging system to provide energy for electrical vehicles. Vehicles or users may be instructed to route onto or away from the charging system based on the optimal number of vehicles.

The following embodiments present systems and techniques for optimizing the charging lanes of one or more roadways. In some embodiments, lanes are turned on or off based on the requirements of the system (e.g., user demand), which may include adding or removing lanes to the lane charging system. In other examples, users are routed based on the requirements of the system. In other examples, tolls or other incentives are introduced, removed, or modified based on the requirements of the system. In other embodiments, the electric vehicles may absorb power from the power grid when excess power is available. The excess power may be transferred to other locations or saved for times when less power is available at the power grid.

Figure 1:
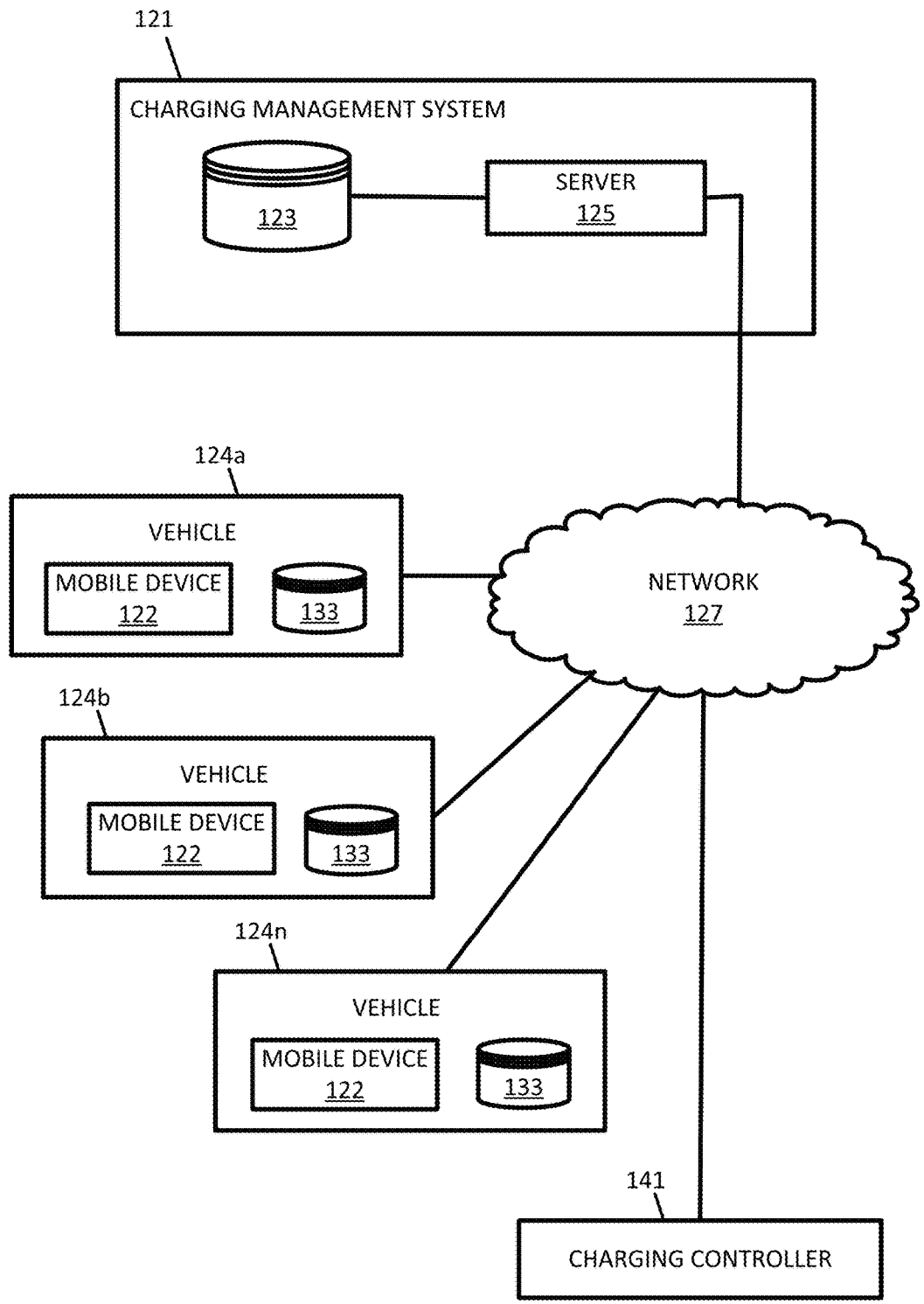
FIG. 1 illustrates an example system for implementing a variable lane charging system.

FIG. 1 illustrates an example system for implementing a variable lane charging system. In FIG. 1, one or more vehicles 124a, 124b, . . . 124n are connected to the server 125 though the network 127. The vehicles 124a-n may be directly connected to the server 125 or through an associated mobile device 122. A charging management system 121, including the server 125 and a geographic database 123, exchanges (e.g., receives and sends) data from the vehicles 124a-n. The charging management system 121 also instructs the charging controller 141 to control one or more charging devices associated with one or more lanes of a roadway in order to implement lane charging for a roadway. The mobile devices 122 include databases 133 corresponding to a local map, which may be modified according to the server 125. The mobile device 124a-n may be standalone device such as smartphones or devices integrated with vehicles. Additional, different, or fewer components may be included.

The charging management system 121 identifies a road segment in a geographic region from the geographic database 123. The road segment may be associated with a current location of one or more mobile devices 122 reporting location data to the charging management system 121. The road segment may be identified as part of the geographic region as the charging management system 121 iterates through all of the road segments in the geographic region, or a subset of the road segments in the geographic region. The charging management system 121 may iterate through all or the subset of roadways at particular time intervals in order to update the charging status of the roadways.

The charging management system 121 may receive or generate real time data or substantially real time data at a lane charging management system. The real time data may be received or derived from one to several sources. One example source in the vehicles 124a-n. The vehicles 124a-n may collect and distribute data regarding location, speed, destination, routing, heading, or another state of the vehicle. Another example source includes a weather service that monitors weather and/or forecasts weather. Another example source includes a traffic service that monitors traffic and/or forecasts traffic. Another example source includes metrics of the charging management system 121. For example, current demand or usage of the charging network is real time data. The term substantially real time data may include data in real time that is received within a predetermined time range of the event that the substantially real time data describes. Example time ranges include 10 milliseconds, 100 milliseconds, 1 second, and 2 seconds. The real time data may be substituted with delayed data that describes events occurring more than the predetermined time range prior to the time the data is received.

The charging management system 121 may generate a lane charging command for a charging device associated with the road segment in response to the real time data. The lane charging command may designate whether or not a particular charging lane is tuned on or off. Thus, power may be provided or removed from the charging device associated with the road segment in response to the lane charging command. The allocation of power to the charging device for the road segment may be modified in response to the lane charging command.

The lane charging command may also be dependent on a map attribute associated with the road segment. The map attribute may be a slope of the road segment, a banking of the road segment, or a curvature of the road segment. Electric vehicles may require more power when climbing a hill, navigating a curve, or a navigating a banked road. The lane charging command may be adjusted so that upward sloped road segments provide more power than downward sloped segments.

The lane charging command may instruct one or more of the vehicles 124a-n. The lane charging command may provide routing to the vehicle in order to take a path that is conducive to charging the vehicle or meets the needs of the vehicle based on the planned route. The lane charging command may instruct the vehicle to change lanes at certain times to provide adequate charging to the electric vehicle.

The lane charging command may instruct the electric vehicle to move toward or away from charging lanes based on the electricity grid. When surplus electricity is available, it may be advantageous for electric vehicles to maximize the charge level of the batteries, which in effect stores power from the grid.

Figure 2:
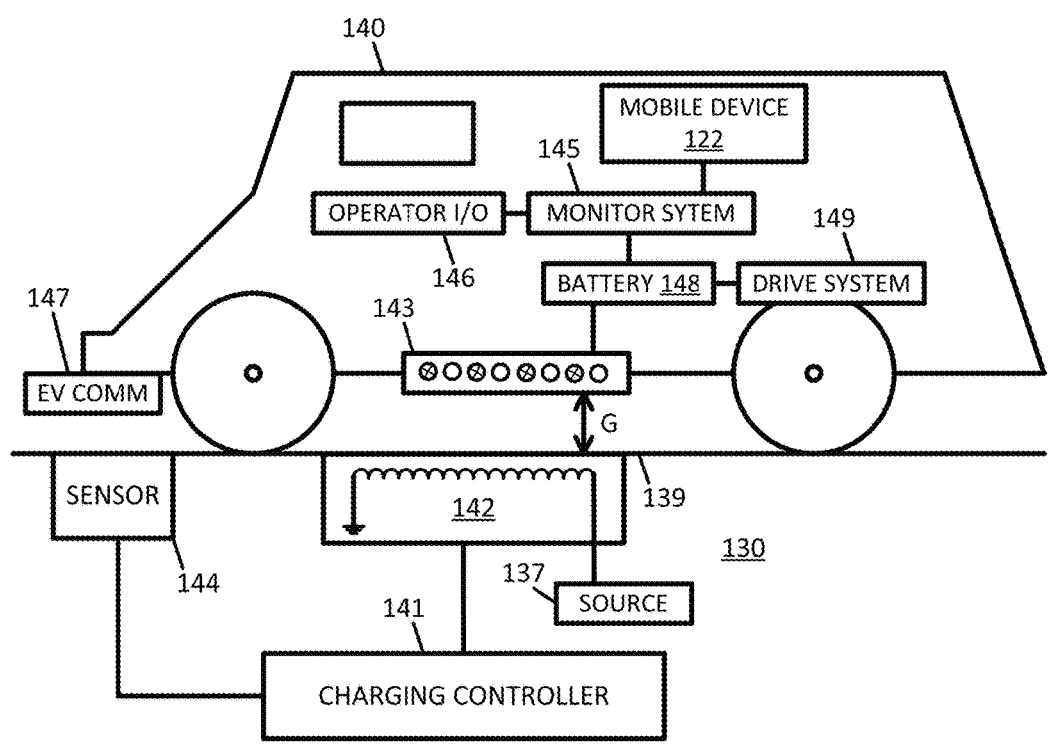
FIG. 2 illustrates an electric vehicle and charging lane.

FIG. 2 illustrates an electric vehicle 140 and a charging lane 130. The charging lanes includes a road power module 142, and optionally, a sensor 144, and either or both of which may be electrically connected with the charging controller 141. The electric vehicle 140 may include a vehicle power module 143, a monitor system 145, an operator input output (I/O) system 146, a battery 148, a drive system 149, and an electric vehicle communicator 147. The vehicle 140 may be associated with the mobile device 122, which may be integrated with the vehicle 140 or a portable device installed in the vehicle or carried by a user of the vehicle. Additional, different, or fewer components may be included.

The battery 148 of the electric vehicle 140 powers the drive system 149. The drive system 149 may include an electric motor coupled with a gear train for driving the wheels of the electric vehicle 140. The drive system 149 may also include a regenerative system for converting mechanical energy of the wheels back to electrical energy stored by the battery 148. The regenerative system may be triggered on downward slopes. The battery 148 may include multiple batteries or cells. One or more batteries may be lithium ion batteries, lead batteries, nickel metal hydride batteries, nickel cadmium batteries, or another type of batteries.

The road power module 142 may be installed below the road surface 139 of the charging lane 130. The road power module 142 may include an induction coil and power the coil from source 137. Thus, the road power module 142 may include a switch for turning on, turning off, and/or modifying the power level passed through the coil. The source 137 may include a connection to the power utility or a renewable source of power (e.g., solar panels or windmills near the roadway).

The power signal passed through the coil may have a variety of electrical properties including different voltage levels, different frequencies, and different phase components. The power signal may be single phase or three phase. The power signal may be at a predetermined voltage level which may be set according to the road power module 142 and the vehicle power module 143 or the frequency of the power signal. The predetermined voltage level may be set by the charging controller 141. The predetermined voltage level may be set as a function of charge level of the battery 148, the density of vehicle on the charging lanes, or another factor.

The power signal from the utility may be at a low frequency level (e.g., 60 Hz or 50 Hz), and may be modified by a coupling frequency factor in order to drive the coil of the road power module 142 at a frequency that is transmitted to the vehicle power module 143. The coupling frequency may be implemented by the inductance or reactance of the coil. Examples for the coupling frequency factor may be 300 to 2000, providing a coupling frequency through the coil of 1.5 kHz to 12 kHz. At the coupling frequency, the road power module 142 generates an electric field across gap G that induces a current in the vehicle power module 143.

The frequency of the coil may be adjustable over time. In one example, the frequency of the coil, as adjusted by changing the coupling frequency factor. The coupling frequency factor may be adjusted through a network of inductors of the road power module 142.

The frequency of the coils may be adjusted to facilitate a resonant frequency between the road power module 142 and the vehicle power module 143. The resonant frequency increases or maximizes the efficiency of the inductive charging. The resonant frequency may be the frequency at which the inductive reactance is equal to the capacitive reactance. The resonant frequency may be set by a quantity of coils, a dimension of the coils, or an arrangement of the coils of the road power module 142 and/or the vehicle power module 143. The frequency of the coils may deviate from the resonant frequency by a predetermined range or a predetermined frequency range.

The vehicle power module 143 may include an AC to AC converter from changing the induced power signal from the coupling frequency to a usable frequency for charging the battery 148 or powering the drive system 149. The AC to AC converter may include at least one rectifier, at least one diode bridge, and/or at least one matrix converter. The usable frequency from the output of the AC to AC converter may be a 50 Hz or 60 Hz sinusoidal signal (e.g., sine wave).

FIG. 2 illustrates that the road power module 142 and the vehicle power module 143 are separate by a gap G. The frequency of the current in the coils of the road power module 142 and/or the vehicle power module 143 may be tuned to the gap. The relationship of the gap may be a function of the wavelength of the inductive field between the coils. In one example, the gap may be adjusted by a mechanical device that raises or lowers the vehicle power module 143. The mechanical system may include a stepper motor, a solenoid or another mechanism for adjusting the gap. The monitor system 145 may provide feedback regarding the rate of charging received at the battery 148 in order to control the mechanical device to adjust the gap. Alternatively, the gap may be controlled based on the speed of the vehicle 140 or based on the type of roadway traveled the vehicle 140.

The vehicle power module 143, the road power module 142, or both may include multiple coils. The multiple coils may be arranged to correspond with each other. The coils of the vehicle power module 143 may be arranged at various angles to each other in order to ensure that at least one coil is at the optimal angle with the coil of the road power module 142. Different coils may be electrically coupled to different batteries or different cells of a single battery.

Other systems besides inductive coupling may be used. Overhead rails or roadway rails may conduct electric power directly to the vehicle power module 143. The overhead rails, or an overhead electrical net, may extend at a distance above the roadway. The roadway rails may be mounted along the roadway just above the surface of the roadway or adjacent to the roadway. In another example, electromagnets may apply power magnetically to the vehicle power module 143.

The monitoring system 145 may include specifically programmed to manage the electrical system of the vehicle 140. The monitor system 145 may include controls for regulating the charging of the battery 148. The monitoring system 145 may control interchanging between the battery 148 driving the drive system 148 and the drive system 149 regeneratively charging the battery 148.

The monitoring system 145 may provide data for the operator I/O system 146. The operator I/O system 146 may include at least one input device and at least one display device. The operator I/O system 146 may be integrated with a dash of the vehicle 140 and the control system of the vehicle 140. Alternatively, the operator I/O system 146 may be integrated with the mobile device 122. The monitoring system 145 may calculate the current charge or storage level of the battery 148. The monitoring system 145 may generate a message indicative of the remaining charge level (e.g., percentage of battery remaining) of the battery 148 and send the message to the IO system 146, which displays the storage level to the user.

The monitoring system 145 may provide data for the another status of the battery 148 such as the amount of time remaining before full charge is achieved, or other data for the battery 148. The amount of time remaining before full charge is achieved may be based on a route that has been calculated and the vehicle 140 is following. In other words, the availability of charging on subsequent road segments, as indicated by map attributes of the subsequent road segments, may affect a calculation for time or distance to full charge, which is displayed by the operator I/O system 146.

The monitoring system 145 may provide data for the status of the drive system 149. The status of the drive system 149 may include a speed of the vehicle, a mode indication for whether the drive system 149 is current consuming energy, draining the battery 149, or regenerating energy, charging the battery 148.

The monitoring system 145 may cause the battery level to be communicated in the reverse direction of power flow through the vehicle power module 143 and the road power module 142 to the charging controller 141. In one example, the monitoring system 145 generates a message or data packet including the battery level, which is transmitted using the mobile device 122 to the charge management system 121. In another example, the monitoring system 145 instructs the vehicle power module 143 to modulate the data indicative of the battery level on the coil which is received and decoded or demodulated by the vehicle power by the road power module 142.

The charging controller 141 may turn the road power module 142 on and off according to detection of the vehicle 140. The sensor 144 may be coupled to the monitoring system 145. The sensor 144 may include a device for detecting the vehicle 140. In one example, individual vehicles are detected and in another example the average vehicle rate is detected.

The sensor 144 may include an optical sensor. The optical sensor may read one or more indicia on the bottom of the vehicle 140. The indicia may include a bar code, a quick response code, alphanumeric characters or other information printed on a label or on the chassis of the vehicle 140. The indicia may identify the vehicle 140 as an electric vehicle. The indicia may indicate the storage capacity of the battery 148, the make and/or model of the car or of the electric motor system of the car, or the energy usage characteristics of the electric vehicle 140. The usage characteristics may include an amount of power required by the vehicle 140 at a range of speeds or a usage coefficient that relates the power usage of the vehicle 140 to the speed of the vehicle 140. An example usage coefficient may be in units of power per speed (e.g., kilowatts per miles per hour, kw/mph). The sensor 144 may include a wireless communication interface for communicating with electric vehicle communicator 147. The sensor 144 may receive data including any information described herein with the indicia from the electric vehicle communicator 147.

In another example, the sensor 144 and the electric vehicle communicator 147 may exchange information wirelessly. Example forms of wireless communication include radio frequency (RF) transmission, optical communication, or magnetic communication (e.g., RFID). In one example, similar communication is facilitated between the power module 142 and the vehicle power module 143. For example, the information from the indicia may be encoded in data that is modulated on the charge signal itself. For example, using pulse width modulation or another technique the charging signal is a carrier signal for the modulated data describing the battery, the vehicle, or other information relative to the usage of the charging system.

The sensor 144 detects the indicia or other data and conveys the data to the charging controller 141 or the charge management system 121, which in turns instructs the charging controller 141. Based on the indicia, the charging controller 141 may change the frequency or power level of the road power module 142. That is, some vehicles may be best charged at a specific frequency or amplitude and others may be best charged at a different frequency or amplitude.

The charging controller 141 may also monitor the flow of vehicles on the road and their respective charging requirements based on the indicia. The charging controller 141 may monitor the flow of vehicles based on the power usage of the road power module 142. While not completely efficient energy transfer, the usage of the road power module 142 may be proportional to and may estimate the energy transferred into charging the battery 148. The charging controller 141 may monitor the flow of vehicles based on the data from the sensor 144.

For any given charging controller 141, the flow of vehicles is indicative to upcoming usage for a downstream charging controller. The charge management system 121 may receive data indicative of flow of vehicles from one charging controller and generate commands for a downstream charging controller.

Figure 3:
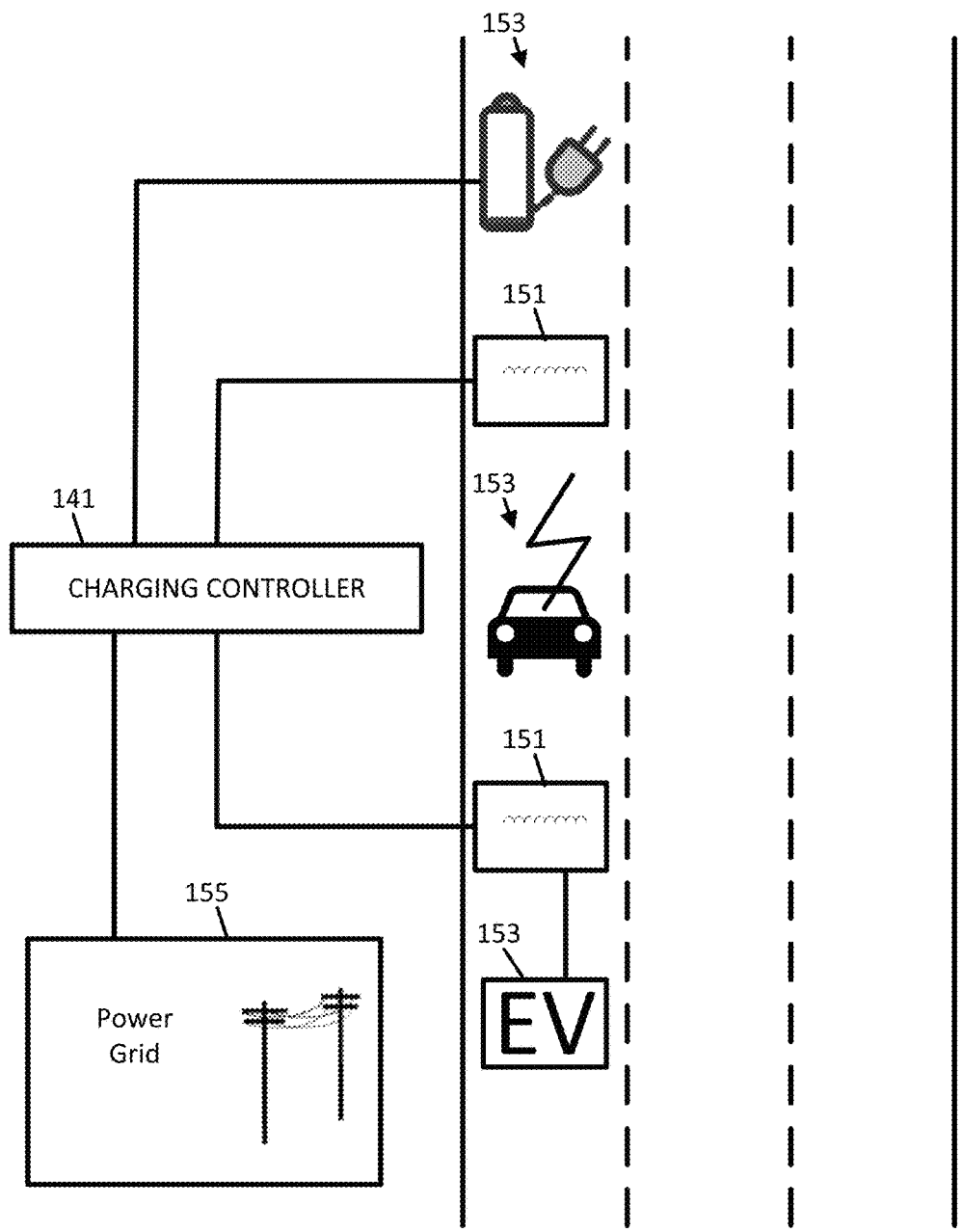
FIG. 3 illustrates an embodiment of a variable charging lane.

FIG. 3 illustrates an embodiment of a variable charging lane. The charging controller 141 may be coupled with the power grid 155 to provide power to the charging device 151. Additional, different, or fewer components may be included.

The roadway may include multiple lanes, and a subset of the multiple lanes are charging lanes. The roadway may be described by one or more road segments stored in the database 123. The road segment may include road attributes including a lane charging attribute that indicates whether a particular lane is a charging lane. A road segment may include attributes for each lane. An example road attribute may indicate whether a lane is a charging lane or not a charging lane. The road attribute may indicate that a lane is equipped with charging or capable of being a charging lane. For any given time whether or not an equipped or capable charging lane is currently a charging lane may depend on the charging controller 141.

The roadway may include one or more indicators 153 that indicates that a charging lanes is a charging lane. One or more of the indicators 153 may be a permanent indicator, such as paint or reflectors on the roadway surface 139. One or more of the indicators 153 may be a temporary indicator, such as a variable sign, light emitting diodes (LEDs), a liquid crystal display (LCD), or another display.

The charging controller 141 or the charging device 151 may control and/or power the temporary indicators 153. The charging device 151 may be electrically coupled with the charging device 151 such that the temporary indicators 153 are illuminated with the charging device 151 receives power. Alternatively, the temporary indicator 153 may be controlled by the charging controller 141. The charging controller 141 may send an activate instruction to the temporary indicator 153 when the charging device 151 is turned on and a deactivate instruction to the temporary indicator 153 when the charging device 151 is turned off.

The charging devices 151 may be placed along the roadway at specific intervals. The specific intervals may be varied according to the functional classification of the roadway. Faster roadways may include charging device 151 at a smaller interval. For example, charging devices 151 on arterial roads may have a first interval (e.g., small intervals), charging devices 151 on collector roads may have a second interval (e.g., medium intervals), and/or charging devices 151 on local roads may have a third interval (e.g., large intervals). The interval for charging devices 151 may be inversely proportional to the speed of the road because charging can be received better as vehicles are traveling slower and speed more time adjacent to the charging devices 151.

The charging devices 151 may be staggered such that certain charging device 151 are on and certain charging device 151 are off at any given time. For example, the charging controller 141 may establish multiple modes of coverage for the charging devices. A high mode of coverage may include activation of all of the charging devices 151, which maximizes the electrical charge received by the vehicles. A medium mode of coverage may include activation of less than all of the charging devices 151 (e.g., every other charging device, every third charging device, every fourth charging device, or another percentage of the charging devices), which provides a medium level of electrical charge received by the vehicles. A low mode of coverage may include activation of low number of the charging devices 151 (e.g., every third charging device, every fourth charging device, or another percentage of the charging devices), which provides a low level of electrical charge received by the vehicles.

Power transfer to the charging device 151 to the battery 148 may be bidirectional. That is, in some instances the battery 148 may send energy to the charging device 151. In some instances, the charging controller 141 may receive an indication from the power grid 155 that power availability is low, or the rate for power provided by the power grid 155 is high. In response, the charging controller 141 may collect charge from passing vehicles. The charging controller 141 may determine whether to provide charge to passing vehicles or receive charge from passing vehicles from a variety of reasons. In one example, the charge level of the battery 148 determines the direction of power flow. In another example, the vehicle (e.g., mobile device 122 or monitor system 145) activates either a charge receive mode or a charge send mode based on rate of power to or from the power grid 155, a user setting, or a current charge level of the battery 148.

Figure 4:
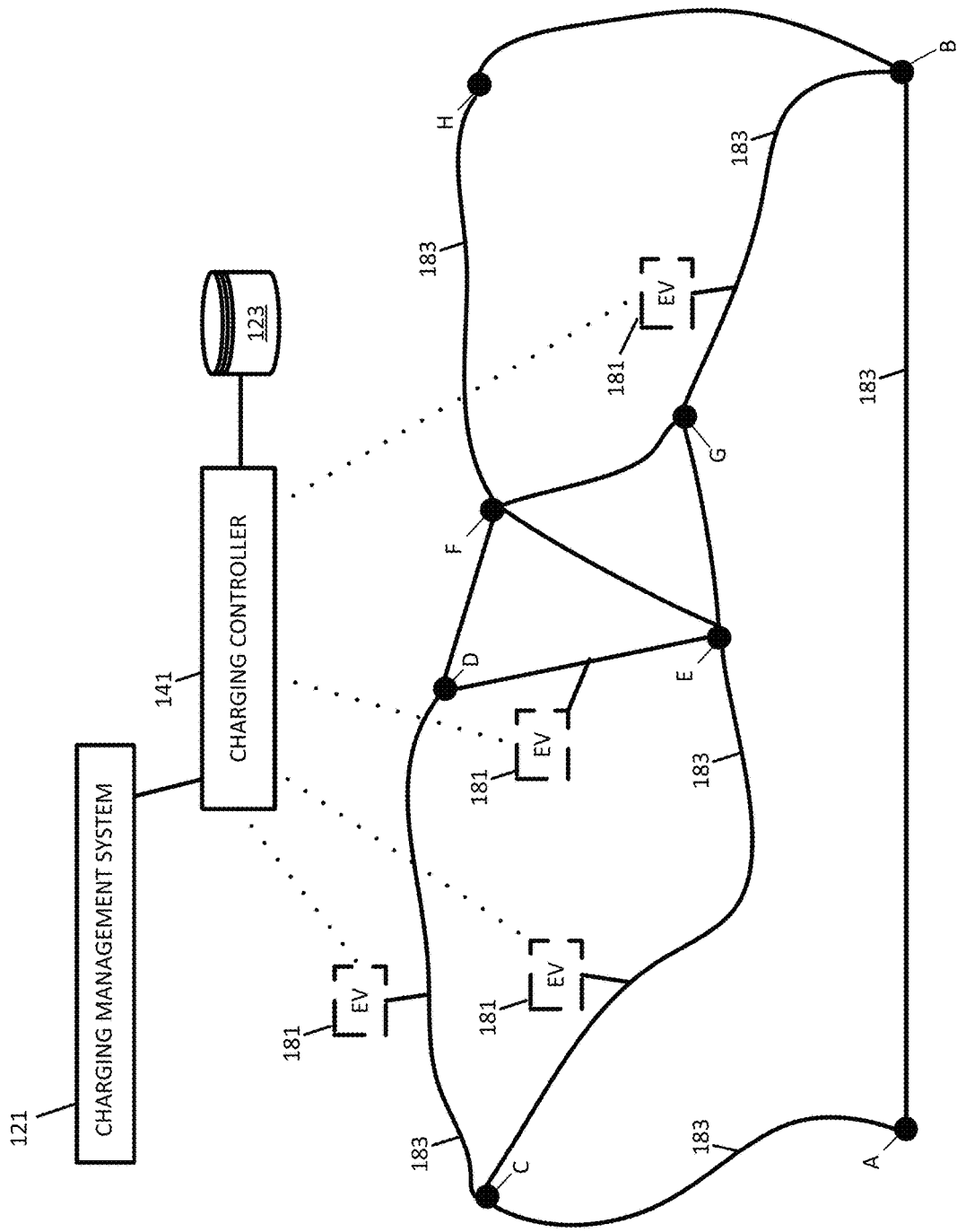
FIG. 4 illustrates an example map network including charging lanes.

FIG. 4 illustrates an example map network including charging lanes under control of the charge management system 121, charging controller 141 and geographic database 123. The map network includes multiple roadways represented by road segments 183. Each of multiple geographic locations A, B, C, D, E, F, G, and H are connected in various series or sequences of the road segments 183, some of which may be associated with electric vehicle charging stations (stations 181). Additional, different, or fewer road segments may be included in the map network.

The charging management system 121 may monitor the location of a vehicle or multiple vehicles based on location data collected by the one or more mobile devices 122 associated with the one or more vehicles. Mobile devices 122 may report their locations and whether or not they are equipped with charging technology. A periodic message may be sent from the mobile device 122 to the charging management system 121 including a location value (e.g., latitude and longitude), a charging indication (e.g., charging compatible or not charging compatible), and a charging level (e.g., indicative of the current level of the vehicle's batteries or expected future level of the vehicle's batteries).

In one example, the charging management system 121 may predict the future location of the vehicle based on successive values in the location data reported by the vehicle to determining the likely route of the vehicle. In another example, the vehicle may report the route and/or the destination that it is traveling to the charging management system 121. In yet another example, the charging management system 121 may have generated the route for the vehicle and therefore already has data indicative of the vehicle's route.

The charging management system 121 and/or the charging controller 141 may activate one or more of the charging devices such as stations 181 based on the route. When the vehicles compatible with roadway charging are headed to a road segment associated with the station 181, the station 181 is turned on, and when no vehicles compatible with roadway charging are headed to a road segment associated with the station 181, the station 181 is turned off.

The charging management system 121 and/or the charging controller 141 may apply similar principles to multiple vehicles. Each station 181 may be allocated to sufficiently charge a specific number of vehicles, or a single charging lane may be allocated to sufficiently charge a specific number of vehicles. For example, along a stretch of roadway a predetermined number of stations 181 may be turned on or a predetermined of lanes having stations 181 may be turned on based on the number of vehicles. The charging management system 121 may compare a quantity of vehicles determined to be traveling along a roadway with a threshold to determine the number of stations 181 that are activated and/or the number of lanes that are activated.

The charging management system 121 may evaluate the locations of vehicles that are traveling throughout the road network in order to determine activation commands for the stations 181. Power may be allocated to a subset of the stations over another subset of stations based on the demand predicted from the vehicles. The charging management system 121 may filter the data received from the vehicles based on the compatibility values received from the vehicles (i.e., data packets received from vehicles that are not compatible with stations 181 may be removed from the analysis).

In one example, the charging management system 121 may evaluate the battery level of vehicles to determine how many vehicles require charging. In one example, a weighted value (e.g., from 0 to 1) may be calculated for each vehicle. A fully charged battery may correspond to a value of 0 and a depleted or nearly depleted battery may correspond to a value of 1. The charging management system 121 may sum the weighted values of vehicles traveling on a road segment or projected to travel on a road segment. The summed value is indicative of the total demand for energy by the electric vehicles that will be or likely will be charging with a set of stations 181. The charging management system 121 may compare the summed value to a threshold to determine whether or not to turn on the stations 181. The charging management system 121 may compare the sum value to multiple ranges to determine how many stations 181 to activate (e.g., a first threshold may correspond to a first quantity of stations, a second threshold may correspond to a second quantity of stations, and so on).

A route may be calculated for one or more vehicles based on availability of the charging stations 181, battery level of the vehicle, or predicted future conditions. In one example, the route is generated according to the locations of the charging stations 181, and in another example the route is generated according to a current status of the charging stations 181. The charging management system 121 may calculate a route for one or more vehicles or individual vehicles or mobile device 122 may calculate routes based on data received from the charging management system 121. When a particular vehicle has a battery level sufficient for a route from the origin to the destination, the shortest route is selected, but when the vehicle does not have sufficient battery level priority is given to a route including one or more charging stations 181, even if that route happens to be longer. In one example, the route is calculated based on the location of charging stations 181 and availability of renewable sources for the charging stations, which is discussed in more detail below. The availability of renewable sources may depend on weather (e.g., likelihood of wind or sun) for areas including road segments associated with charging stations 181.

The charging management system 121 calculate rates for the charging lanes based on the demand from the vehicles and/or the operation of the charging stations 181. The rates may be applied to a tolling system in proximity to the roadway, as discussed herein with respect to FIG. 6. The rates may be applied to a local tracking system implemented by mobile device 122 that monitors and logs data describing tolls or other payments for use of the use of the charging system or specific lanes, which may accumulate over time.

The rates may be variable according to the current location of vehicles on the map network. For example, when many vehicles are headed for a particular road segment, or currently traveling on the road segment, the associated charging stations 181 may be overloaded and/or traffic congestion may be present on the road segment. The charging management system 121 may encourage other drivers to select an alternate route.

Consider a route from node C to node B. The charging management system 121 identifies that the charging station 181 for the road segment from G to B has too much traffic currently or projected in the future. The charging management system 121 may increase the rate charged for traveling on the road segment from G to B, or the charging lane when the road segment is a multilane roadway. Vehicles may adjust their routes accordingly in a variety of techniques. For example, vehicles traveling along the road segment from E to G may choose a longer route to reach B through nodes F and H. Vehicles traveling on the road segment from C to E may slow down in order to receive more charging there so that the road segment from G to B can be avoided or the charging lane therein may be avoided. Other vehicles may opt to turn around or otherwise head for node A to take the direct route from node A to B with no charging available.

In other example, the vehicles may select routes in order to maximize the amount of time traveling on road segments with charging stations 181. The route may be selected to maximize charging even if the shortest route and/or the fastest route is not selected. Consider the route from nodes A to B. A direct path on the road segment from A to B is likely both the shortest route and the fastest route. Some vehicles or mobile devices 122 may generate a route with more charging stations 181 based on a current level of the battery. For example, a higher level of the battery, but still in need of charging, a route may be selected from node C to node E to node G to node B. At a lower level of the battery, a route with more charging may be selected from node C to node D to node E to node G to node B. Any of these routes may be adjusted depending on the activation status of individual charging stations 181.

Figure 5:
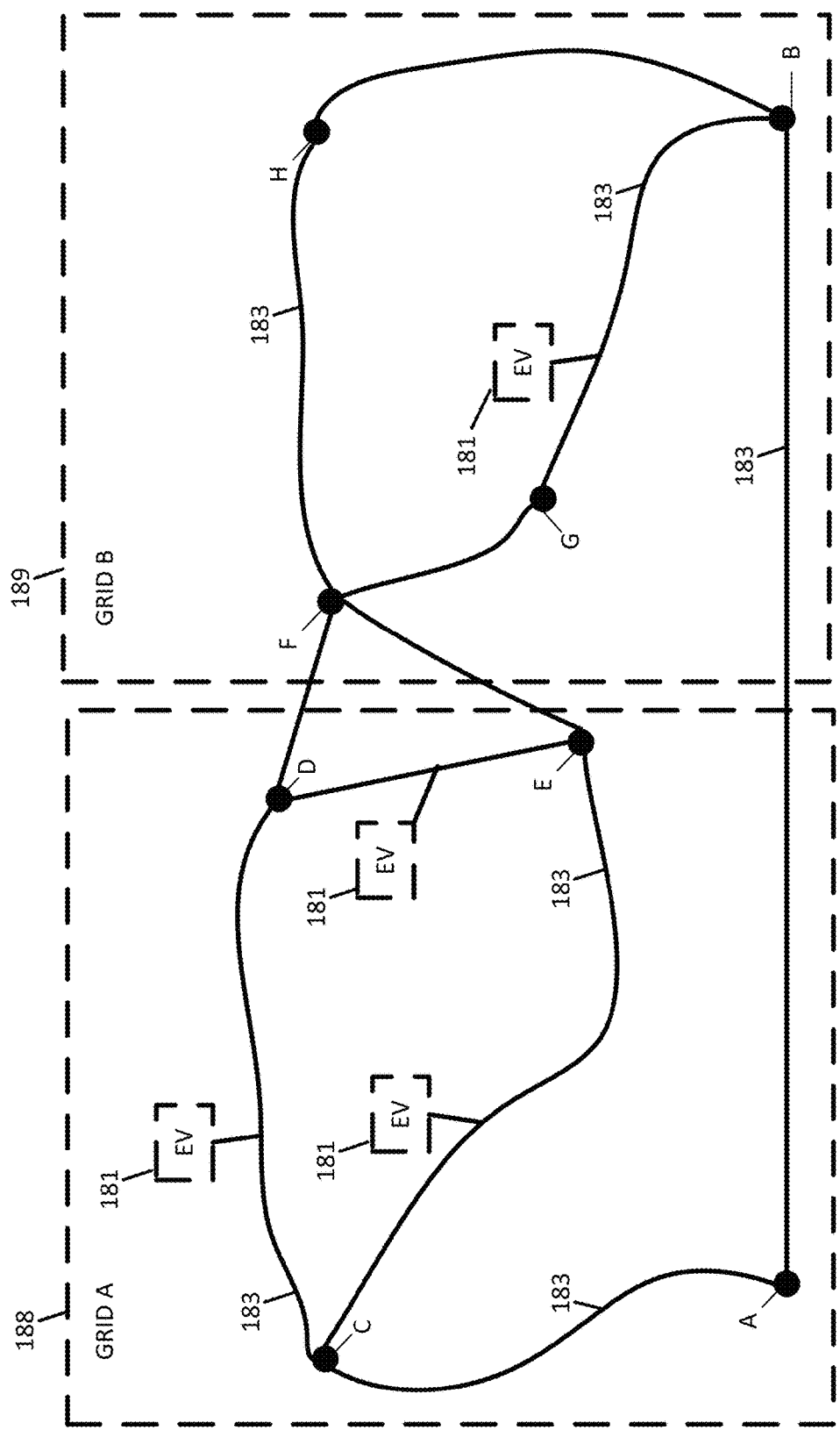
FIG. 5 illustrates an example map network including energy storage control.

FIG. 5 illustrates an example map network including energy storage control. The map network includes a first grid 188 and a second grid 189 illustrated by dotted lines. The following examples include techniques in which the vehicles serve as a storage device for energy from one or more of the grids. In some examples, energy from one of the grids is stored in the vehicles at times of, or in response to, low rates or high availability of energy. In other examples, energy is effectively transferred from one grid to another grid at times of, or in response to, different rates or different availabilities of energy between the grids. Different grid arrangements may be used. A grid may be defined as an electrical power network in which one or more sources provide power to the grid and one or more loads extract power from the grid. Energy or power is commoditized and no particular source or load is differentiated from another for the operation of the grid itself. Alternatively, any of the examples described herein may be applied to portions of the same grid (i.e., first grid 188 and second grid 189 may be substituted with different portions of the same grid).

The charging management system 121 or the charging controller 141 may instruct one or more vehicles based on real time data for the availability or rates of power (e.g., cost or price of the electricity) on the grids. The charging management system 121 or the charging controller 141 may receive usage data from the grids by way of an administrative device associated with the grids. The usage data may indicate a current rate or projected rate for energy provided by the grid (e.g., kilowatt-hour). The usage data may indicate a demand value indicative of the loads on the grid at a current time.

When the rates or demands are at or above a threshold value, the charging management system 121 or the charging controller 141 may generate a vehicle charging command based on the usage data. The vehicle charging command may instruct one or more vehicles (e.g., vehicle power module 143) to receive charge from the charging station 181. The vehicle charging command may override decisions for charging that the vehicle (e.g., monitor system 145) may have otherwise made. For example, the battery level may not be low enough for the vehicle to seek out additional charge otherwise.

In response to the vehicle charging command that overrides the default charging algorithm of the vehicle, the vehicle (e.g., mobile device 122) may generate an alternate route to the destination that includes a charging station 181 or additional charging stations. In other words, the mobile device 122 may identify the vehicle charging command from charging management system 121 or the charging controller 141 that instructs the vehicle to charge the battery 148 in response to the state of the electrical grid, which may be independent from the battery level of the vehicle, or current routing of the vehicle. In another example, the vehicle charging command from charging management system 121 or the charging controller 141 may be evaluated in combination with the battery level of the battery or the routing of the vehicle.

That is the mobile device 122 may consider two or more factors including the vehicle charging command, routing of the vehicle, and/or battery level of the battery 148 when generating a route to a destination. The mobile device or the monitor system 145 may instruct the vehicle power module 143 to collect the excess energy from the charging device 151 or road power module 143, store the excess energy in the battery 148 of the vehicle, and deliver the excess energy to a subsequent charging device 151 or road power module 143. The initial charging device or road power module may be electrically coupled to the same grid or a different grid that the subsequent charging device or road power module.

Figure 6:
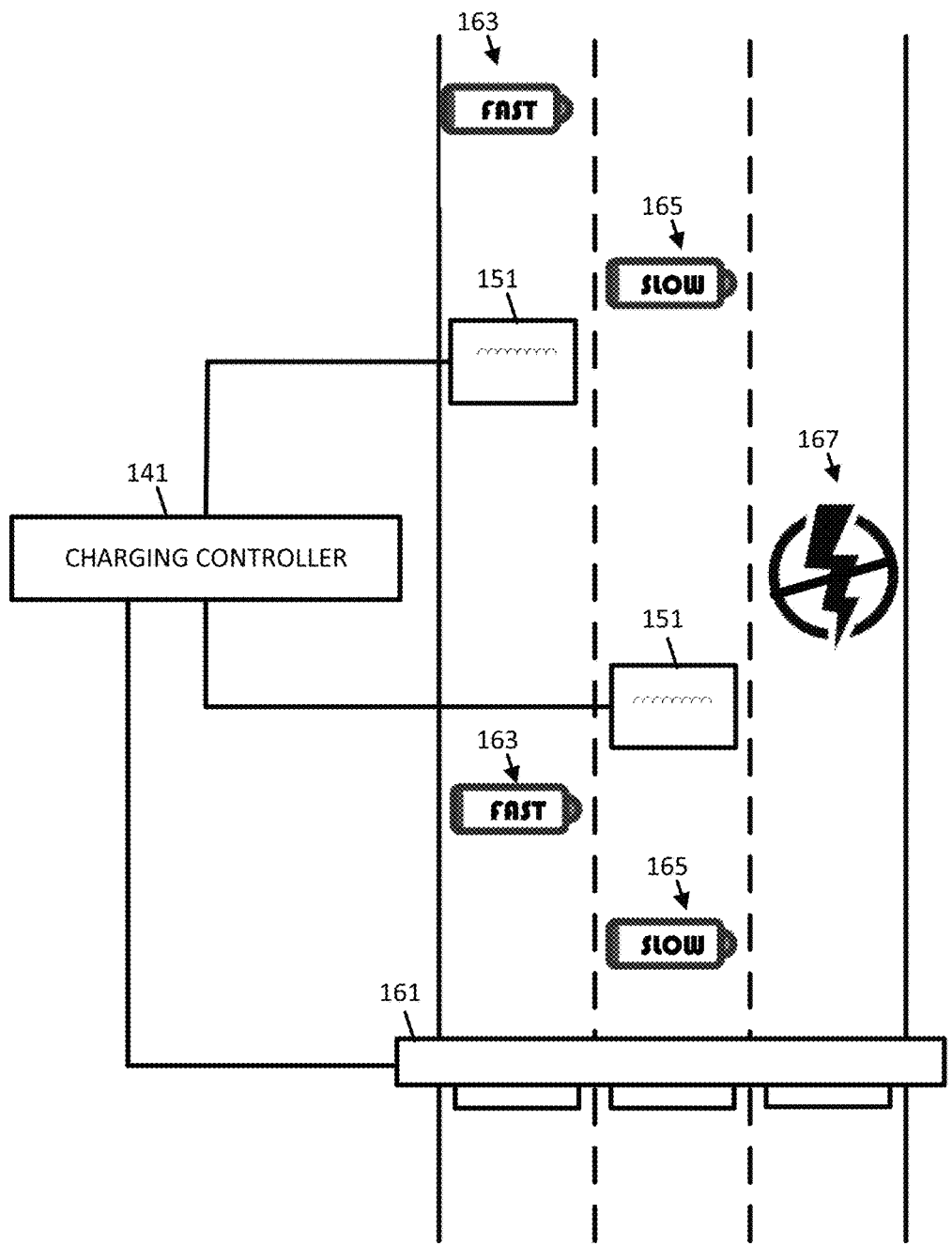
FIG. 6 illustrates an example roadway with multiple charging lanes.

FIG. 6 illustrates an example roadway with multiple charging lanes. The charging controller 141 is electrically coupled with multiple charging devices 151 and with a toll system 161. Additional, different, or fewer components may be included.

The toll system 161 may include radio transceivers that communicate with in-vehicle transponders or mobile devices in vehicles that pass underneath the toll system 161. The toll system 161 collects the identity of the vehicle based on the communication in order to charge a toll to the vehicle. The toll charged to the vehicle may also depend on whether or not the lane traveled is a charging lane. A premium amount may be added to the toll of a charging lane. The charging controller 141 may instruct the charging controller 151 whether to turn on or off the charging lane and in response, instruct the toll system 161 to increase or decrease the toll applied to the lane.

In another example, the toll system 161 may be integrated with the charging system. For example, rather than transceivers or transponders above the roadway, the toll system 161 may communication through the charging system including the charging controller 141 and one or more charging devices 151. For example, the tolling data may be encoded in data that is modulated on the charge signal itself. For example, using pulse width modulation or another technique the charging signal is a carrier signal for the tolling data.

In another example, the charging device 151 may determine whether a passing vehicle is utilizing the charging device 151. This determination may be based on monitoring the road power module 142 for energy consumption, based on information collected by sensor 144, or other communication with the vehicle 140 or mobile device 122. The charging device 151 communicates the usage information, which may be on a vehicle to vehicle basis, to the charge management system 121, which instructs the toll system 161 to adjust the tolls accordingly.

The tolls applied by the toll system 161 may also depend on the amount of charging provided by a charging lane or the speed of charging by a charging lane. The charging controller 141 may control different lanes to charge at different rates. Icons 163 in FIG. 6 indicate a fast charging lane and icons 165 indicate a slow charging lane. The speed of charge lanes may be determined by the type of equipment in charging device 151. The speed of the charge lanes may be actively controlled by the charging controller 141. The speed of the charge lanes may be controlled by adjusting the amount of power supplied to the charging device 151 or the amplitude or frequency of the power signal passing through the road power module 142.

In another example, the difference in charging speeds between the fast lanes and the slow lanes may be applied based on the speed limits of the lanes of the roadway. The amount of charging that a vehicle can receive from the charging device 151 is related to the amount of time the vehicle spends directly above the charging device 151. For example, fast charging lanes may be faster by virtue of slower traffic on the lane and slow charging lanes may be slower by virtue of faster traffic on the lane. In one example, the charging controller 141 may control one or more variable speed signs (e.g., reference numeral 161 in FIG. 6 may alternatively represent variable speed signs) that present different speed limits to the various lanes of the roadway and/or different speed limits over time. Thus, the charging controller 141 may adjust the speeds of the lanes in order to increase or decrease the charging amounts received by the vehicles.

In another example, lanes may be subsidized in a commercial zones where message are displayed on the roadway surface or on billboards to others. Thus, the user or an autonomous vehicle is directed along a specific route, or lanes, for either a subsidized or "free" charging in exchange for either viewing the advertisements placed along the route (e.g., billboards or marquees), or listening to a particular sponsored program (which may be selected automatically and "locked-in" as long as the user is agreeing to the free or subsidized pricing level on the route or lanes), or, in the case of automated vehicles, watching a sponsored program or/or program(s) with advertisements. Another variation of this might be routing through "commercial zones" or "economic zones" meant to incent purchases at businesses along the way in exchange for free or subsidized charging.

Figure 7:
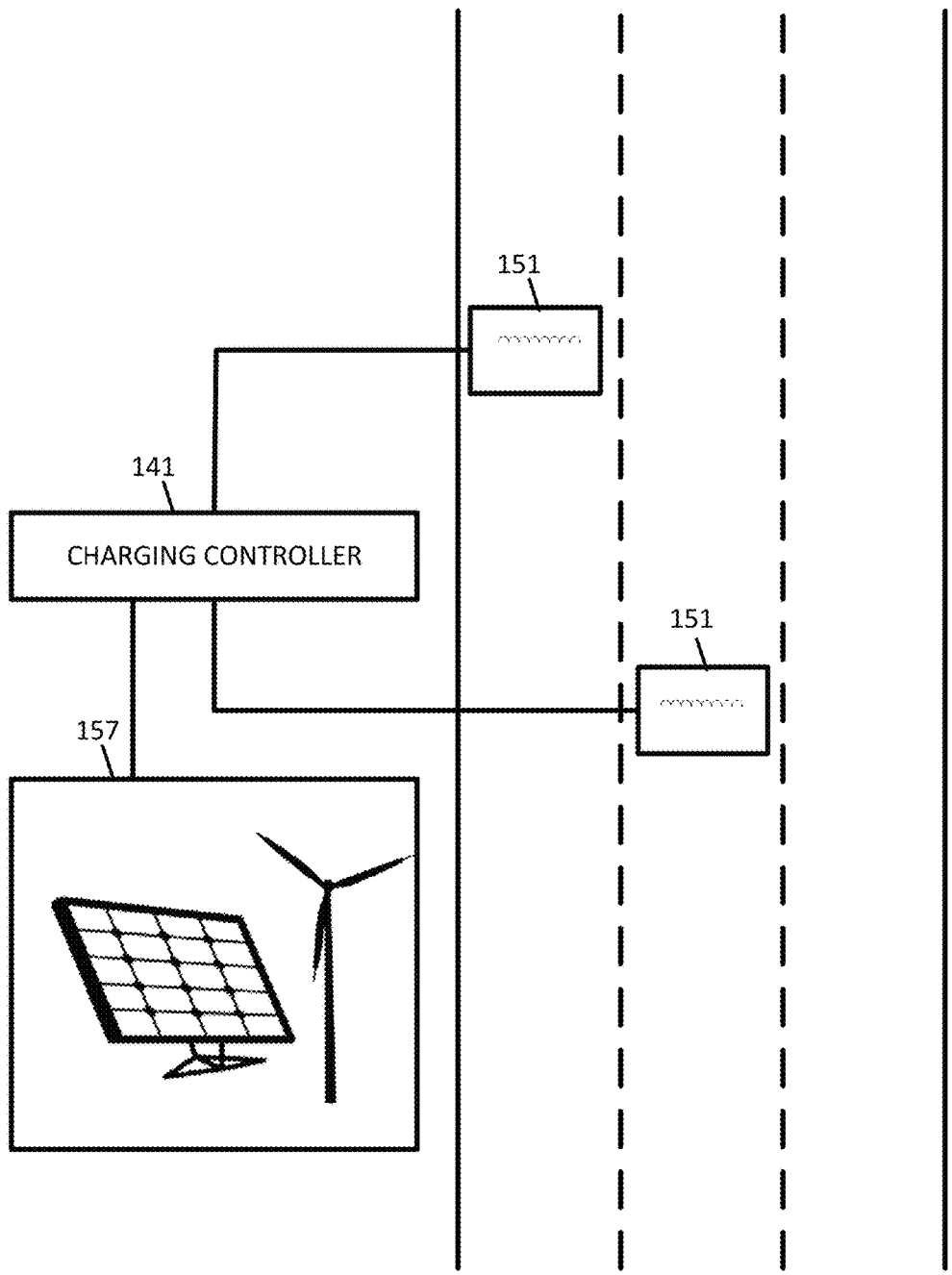
FIG. 7 illustrates an example charging lane and local renewable sources.

FIG. 7 illustrates an example charging lane and renewable sources 157. The renewable sources 157 may include one or more of a windmill that generates electrical energy, a solar panel that generates electrical energy, or a hydroelectric source that generates electrical energy. Additional, different, or fewer components may be connected to the renewable sources 157 and/or the charging station 151.

The renewable sources may be local to the roadway. The term local may be defined geographically. That is, the renewable sources 157 may be geographically local within a predetermined distance from the roadway. In another example, the term local may be defined electrically as the renewable sources 157 are electrically connected to the charging station 151 of the roadway. The renewable sources 157 may be electrically isolated. That is, the renewable sources 157 may serve as an independent grid independent from the other electrical grid. In other words, the only source of energy for the charging station 151 may be the renewable sources 157. In other examples, the renewable sources 157 are connected to the main power grid. The charging station 151 may be controlled to provide power commensurate with the power produced by the renewable sources 157, albeit technically provided from the power grid.

The charging management system 121 or the charging controller 141 may instruct one or more vehicles to collect or store power from the charging station 151 produced by the renewable sources 157 based on real time data. The real time data may include the availability of renewable sources 157, which may be dependent on weather such as wind or sun. Alternatively, the real time data may include a measurement of the production of power at the renewable sources 157.

In addition or in the alternative to the real time data, predictive data may describe forecasted availability of energy from the renewable sources 157. The predictive data may be determined as a function of weather prediction or traffic predictions. For example, a dip in the availability of energy from the renewable sources 157 may coincide with a forecast of rain or clouds. Similarly, the demand for energy may be predicted based on an event likely to cause increased traffic levels. The charge management system may generate instructions for the charging controller 141 or for the vehicles, as described in other examples for real time data, based on the predictive data.

The vehicle charging command may instruct one or more vehicles (e.g., vehicle power module 143) to receive charge from the charging station 151. The vehicle charging command may override decisions for charging that the vehicle (e.g., monitor system 145) may have otherwise made. For example, the battery level may not be low enough for the vehicle to seek out additional charge otherwise. In response to the vehicle charging command that overrides the default charging algorithm of the vehicle, the vehicle (e.g., mobile device 122) may generate an alternate route to the destination that includes a charging station 151 or additional charging stations.

The renewable sources 157 may be electrically coupled to a microgrid. The microgrid may be defined as a self-sustaining independent (or semi-independent) cluster or set of devices that may or may not have a connection back to a main energy grid. The microgrid may be associated with a large scale point of interest such as a military base, a corporate or industrial complex, or a college campus. The large scale point of interest may be an energy independent entity. In one example, a vehicle may be controlled to traverse roadways only within the microgrid. In others, vehicles may move freely between the microgrid and other microgrids or the main grid and may transport stored energy between the microgrids or from the microgrid and the main grid and vice versa. In some examples, vehicles (e.g., mobile devices) may be credited for transferring stored energy. The credit may take the form of future charging of the battery, navigation services, or other services provided to the vehicle or mobile device 122.

Figure 8:
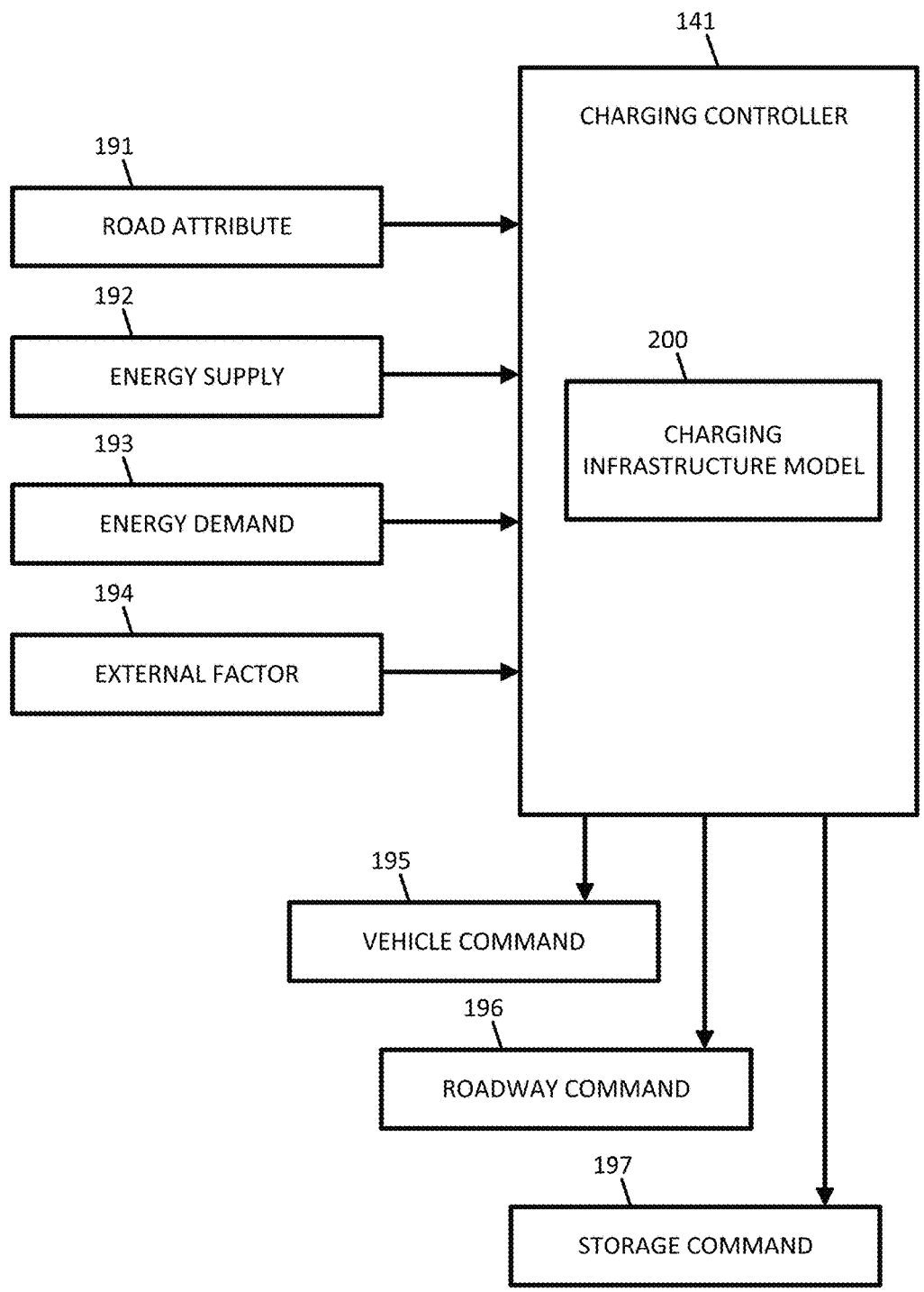
FIG. 8 illustrates a control system for a variable lane charging controller.

FIG. 8 illustrates a control system for a variable lane charging controller 141. The charging controller 141 including a charging infrastructure model 200 receives multiple inputs including any one or a combination of road attribute 191, an energy supply value 192, an energy demand value 193, and an external factor 194. The charging controller 141 including the charging infrastructure model 200 analyzes the one or more inputs and generates a vehicle command 195, a roadway command 196, and a storage command 197.

The road attribute 191 may be a physical characteristic of the road such as slope, elevation, speed limit, or banking angle. The road attribute 191 may be access from the geographic database. The energy supply value 192 indicates an amount of power or energy available on a grid. The energy supply value 192 may be based on to the per unit energy cost of electricity. The energy supply value 192 may be based on a value broadcasted from the utility provided, which may be modulated on the power signal. The energy demand value 193 may be representative of the number of vehicles associated with the variable lane charging controller 141 or an individual charging station. The vehicles may be vehicles traveling on a particular road segment or series of road segments, vehicles routed on a particular route, or vehicles within a geographic or traveling distance from the variable lane charging controller 141 or an individual charging station. The external factor 194 may be a value received from a user or an administrative system. The external factor 194 may be based on a current level of traffic or weather, or a predicted level of traffic or weather.

The charging infrastructure model 200 may be implemented by a specifically programmed controller (e.g., application specific integrated circuit). The charging infrastructure model 200 may assign one or more weights to the inputs. That is, the charging infrastructure model 200 may assign a first weight to the road attribute 191, a second weight to the energy supply value 192, a third weight to the energy demand value 193, and a fourth weight for the external factor 194. The charging infrastructure model 200 may calculate a score based on the inputs. The charging infrastructure model 200 may add the weights to calculate the score. The charging infrastructure model 200 may apply another function to the weights. The charging infrastructure model 200 may apply a learned algorithm from a neural network or fuzzy model to calculate the scores. The score may be based on any combination or a single of one of the inputs.

The charging infrastructure model 200 may determine one or more of the outputs based on the score. The vehicle command 195 may instruct a vehicle to turn on or off charging of the battery. The vehicle command 195 may instruct a vehicle to take a particular route. The roadway command 196 may instruct a charging station to turn on or off. The storage command 197 may instruct a vehicle to store energy irrespective of the local needs of the vehicle.

Figure 9:
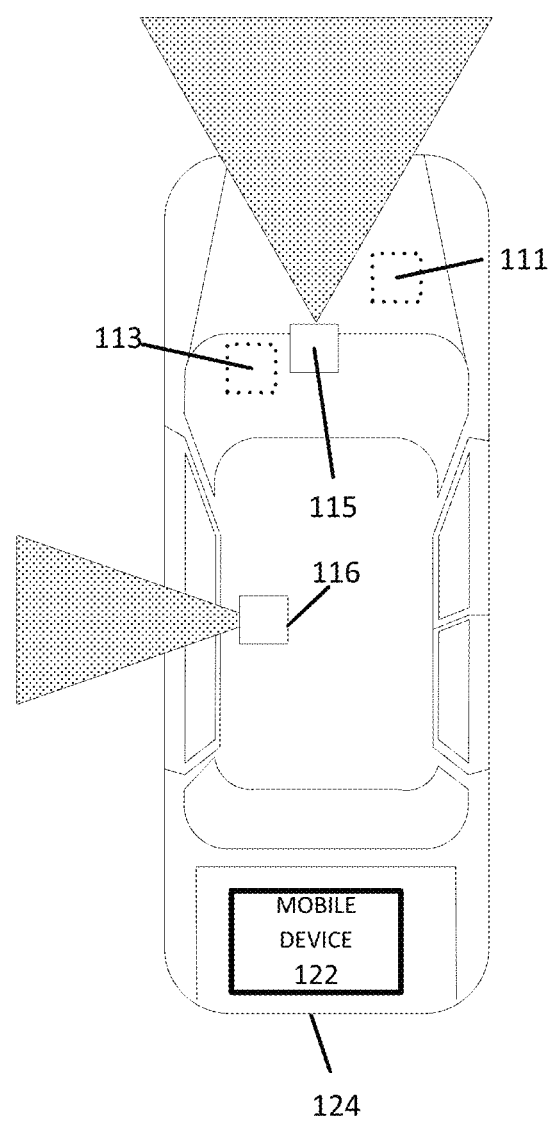
FIG. 9 illustrates an example vehicle for interacting with the variable lane charging controller.

FIG. 9 illustrates an example vehicle 124 for interacting with the variable lane charging controller. A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle. The sensor array may include multiple sensors. Example sensors include an optical distance system such as light detection and ranging (LiDAR) 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The vehicles 124 may include a another global navigation satellite system (GNSS) such as a global positioning system (GPS). The vehicles may 124 include a dead reckoning-type system, cellular location system, locations beacons, wireless (e.g., WiFi) position assist, or combinations of these or other systems, which may be referred to as position circuitry or a position detector. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an inertial measurement unit built or embedded into or within the interior of the mobile device 122. The inertial measurement unit may include an accelerometer, a multi-axis accelerometer, a gyroscope, or any combination thereof.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a gear or transmission sensor, a speedometer sensor, or a tachometer sensor. The gear or transmission sensor may indicate a direction of the vehicle, which may be applied by a dead reckoning system or other logic in the instance that the vehicle is traveling in reverse.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125, which may have been updated according to the collection of data in the embodiments described herein. The assisted driving vehicle may be selected a route based on any of the examples herein, including in response to a charge status or the existence of one or more charging stations. The assisted driving vehicle may turn on or off a charging system in response to data received to any of the examples herein.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to pass the initial observation location or road object in response to the request for additional observations.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and the request for additional observations for the road object.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle and/or other factors such as speed, vehicle lane position, road or weather conditions, lighting conditions or visibility, proximity to surrounding vehicles, proximity to surrounding fixed or mobile objects, road construction, road geometry, driver alertness or attentiveness, or other factors.

Figure 10:
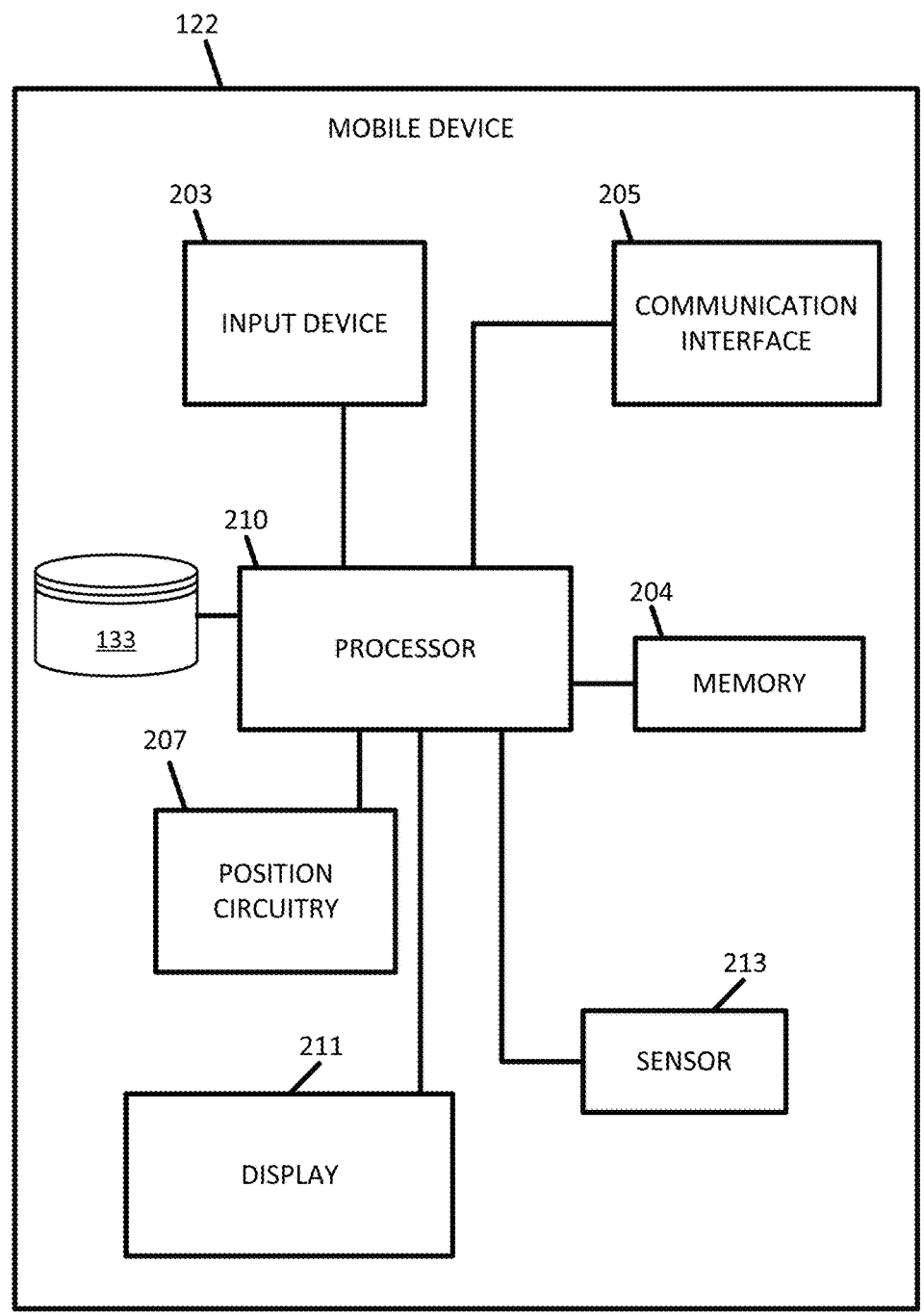
FIG. 10 illustrates an example mobile device.
Figure 11:
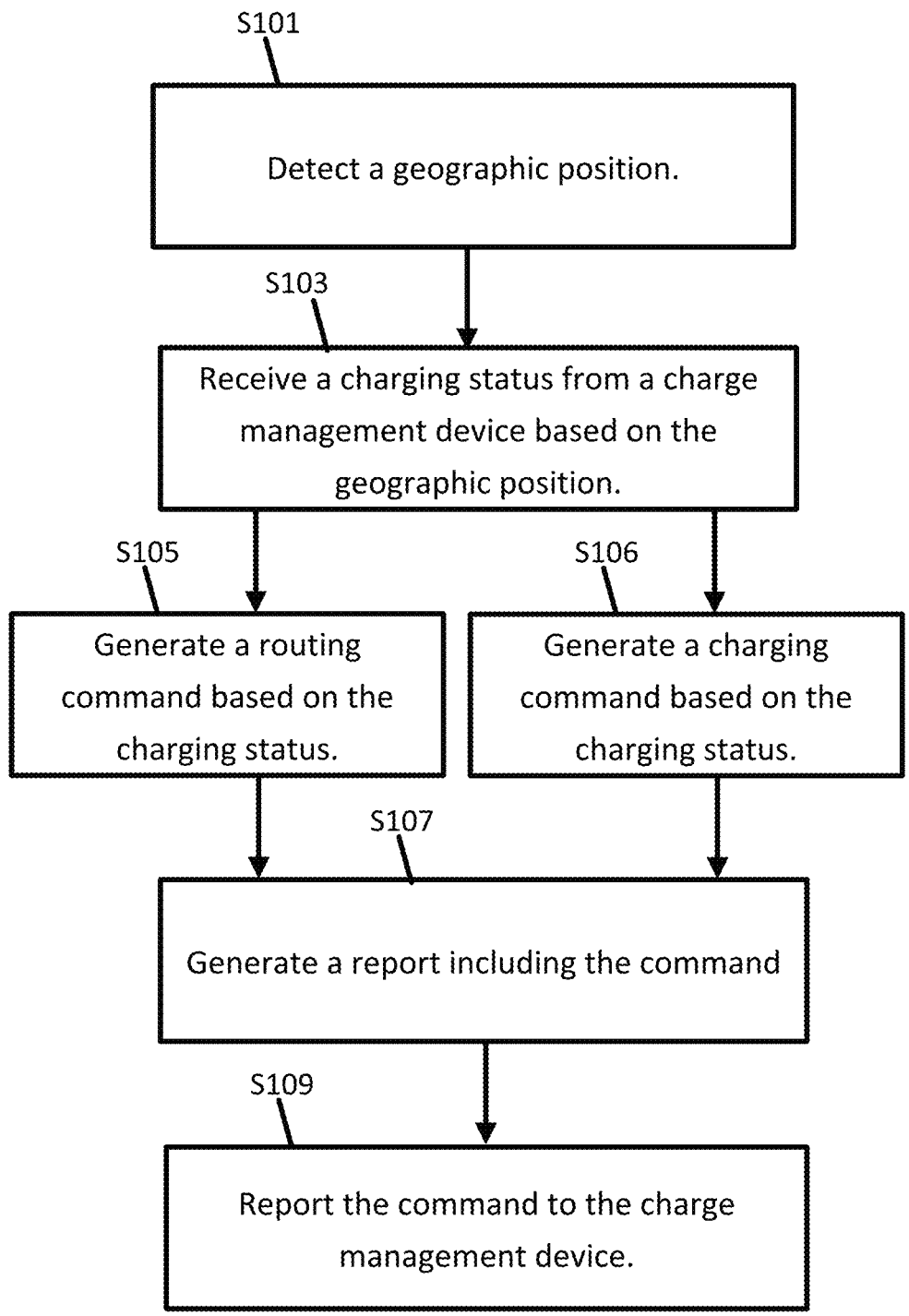
FIG. 11 illustrates an example flowchart for the mobile device of FIG. 10.

FIG. 10 illustrates an exemplary mobile device 122 of the system of FIG. 1. The mobile device 122 includes a processor 210, a vehicle database 133, a memory 204, an input device 203, a communication interface 205, position circuitry 207, a display 211, a sensor 213. The input device 203 may receive settings to enable or disable the mobile device for collecting observations. Additional, different, or fewer components are possible for the mobile device 122. FIG. 11 illustrates an example flowchart for the mobile device of FIG. 10. Additional, different, or fewer steps may be included.

At act S101, the position circuitry 207 or the processor 210 detects a geographic position of the mobile device 122 or the vehicle. The position circuitry 207 is one example means for detecting or determining a geographic position. The processor 210 also includes circuitry serving as means for detecting or determining a geographic position. The detected geographic position of the mobile device 122 may include a latitude and longitude pair. The geographic position may be detected or sampled at periodic intervals in time or distance. The sensor 213, which may include distancing sensors, range sensor, image sensors, or another sensor as described with respect to FIG. 9 may also provide information for determining the geographic position of the mobile device 122.

At act S103, the processor 210 or the communication interface 205 receives a charging status from an external device such as a charge management device or a charging station. The charging status may indicate whether or not charging stations are currently in operation in the area of the geographic position of the mobile device 122. The charging status may indicate whether or not charging stations exist in the area. The charging status may be based on an external state of the geographic area, such as weather (e.g., sun, wind, or rain). The communication interface 205 is an example for a means for receiving the charging status from an external device. The charge management device and the charging station are examples of means for sending the charge status.

Acts S105 and S106 may be performed in the alternative or in combination. At act S105, the processor 210 generates a routing command based on the charging status. The processor 210 may include a routing module including an application specific module or processor that calculates routing between an origin and destination, which may include intermediate waypoints. The routing module is an example means for generating a routing command based on the charging status. The routing command may be a route from the route to the destination. The routing command may be a driving instruction (e.g., turn left, go straight), which may be presented to a driver or passenger, or sent to an assisted driving system. The display 211 is an example means for displaying the routing command. The routing command may be derived from a road network or map data stored in database 133. The database 133 is an example means for storing map data including a road network.

The display 211 may provide an option for the user to select the shortest route, the fastest route, the greenest route, or the most economical route. The shortest route is the route with the shortest geographic distance to the destination. The fastest route shortest projected travel time to the destination given the distance and the associated speed limits along the route. The fastest route may be adjusted for current detect traffic levels or projected traffic levels. The greenest route may be the route that uses the smallest carbon footprint in traveling to the destination. The greenest route may be the route that requires the least non-renewable energy. The greenest route may include the most charging stations or the most charging station per unit length. The most economical route be the routes that requires the smallest cost of energy. The most economic route may depend on the rate or pricing of energy at the charging stations.

At act S106, the processor 210 generates a charging command based on the charging status. The processor 210 may include a charging module including an application specific module or processor that generates the charging command in response to the charging status. The charging module is an example means for generating the charging command. The charging command may include an instruction of whether to activate or deactivate a battery charging system of the vehicle.

At act S107, the processor 210 generates a report including the command (e.g., the charging command or the routing command). The processor 210 may include a reporting module including an application specific module or processor that generates the report. The report indicates whether the vehicle has activated or deactivated charging capabilities. The report indicates whether the vehicle has adjusted a routed or set a route based on the charging status.

The mobile device 122 may generate a routing instruction based on the vehicle database 133. The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system, or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

At act S109, the processor 210 or the communication interface 205 reports the command to the charge management device. The communication interface 205 is a means for communicating the report. In response the charge management device may adjust a projected demand for the charging station.

In one example, the mobile device 122 is associated with an electric truck such as a commercial truck carrying goods, and the route for the electric truck is selected based on the charging status of the charging stations. Other factors for selecting the route may include the size of the load of the electric truck, a classification of the electric truck, a hazmat status of the electric truck, a height of the electric truck for bridges and other obstacles, or other factors.

In one example, the mobile device 122 may be associated with a truck that includes a high amount of batteries or electrical storage capacities. The amount of batteries may exceed the electrical drive propulsion needs of the electric truck. Instead, the mobile device 122 and electric truck is routed from point to point to carry energy from one grid to another or to temporarily store energy for a time period.

In other example, regardless of whether the truck is an electric truck or another type of truck, the truck may transport batteries or other storage devices. For example, containers and semi-trailers may include batteries that are transported along with other goods. The logistics or routing of the trucks may depend on the demand and/or cost of the energy of the storage device in various geographic areas in combination with the destination of the other goods. For example, a truck from point A may be routed to point C over point B when the cost of the goods combined with the cost of energy at point C exceeds that of point B. In an alternative to trucks, railroads, boats, or other transports may be used.

Figure 12:
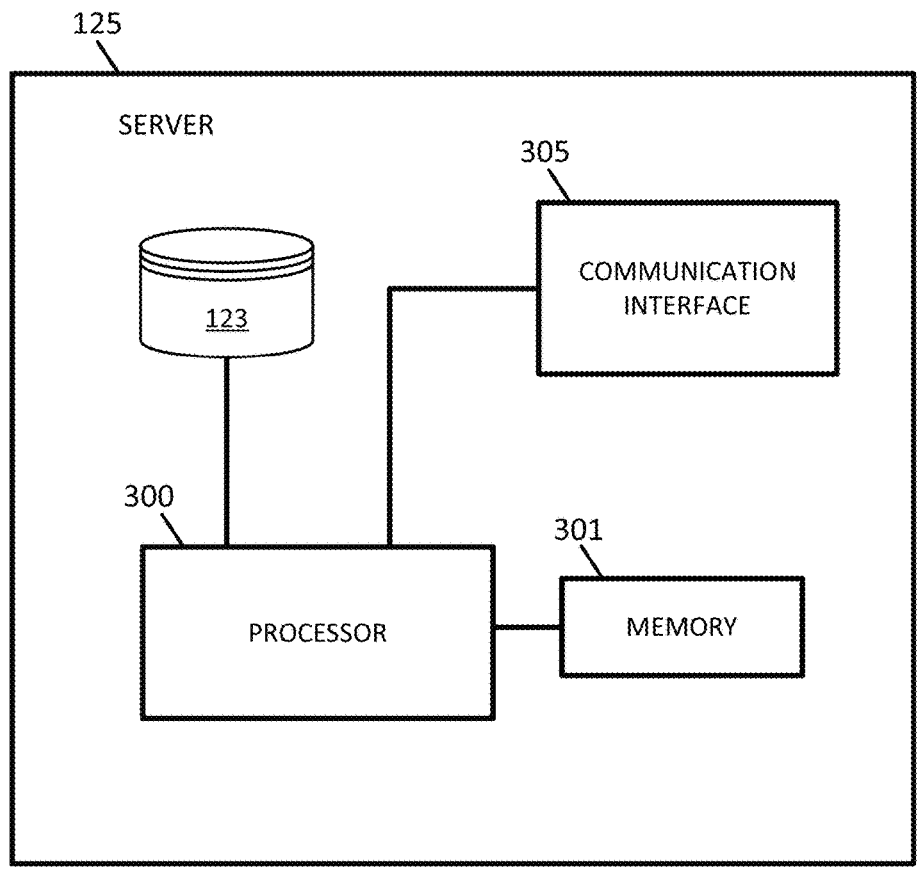
FIG. 12 illustrates an example server.
Figure 13:
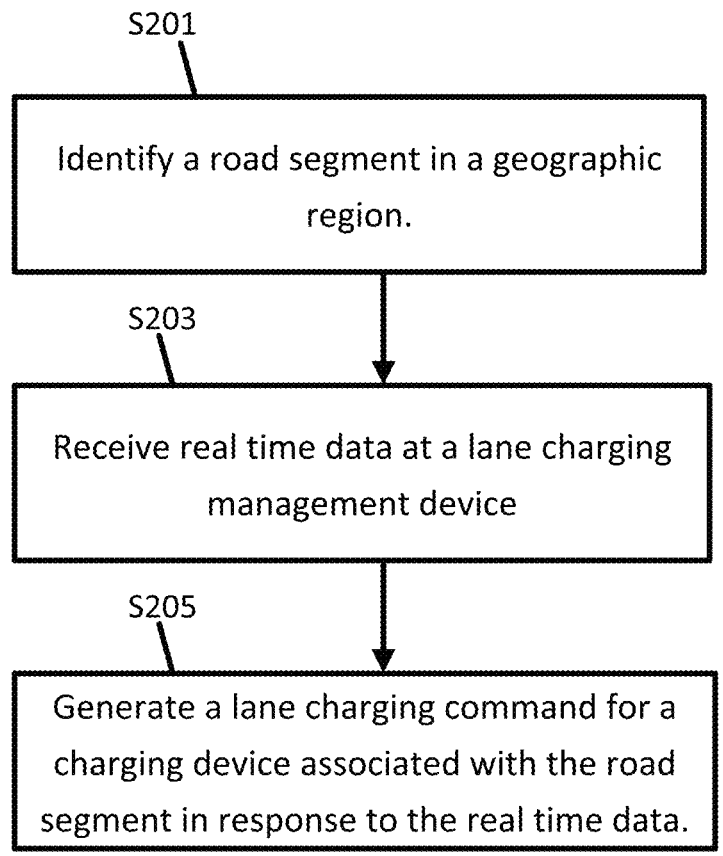
FIG. 13 illustrates an example flowchart for the server of FIG. 12.

FIG. 12 illustrates an example server 125, which may apply to the system of FIG. 1. The server 125 includes a processor 300, a communication interface 305, a memory 301, and a database 123. An input device (e.g., keyboard or personal computer) may be used to enter settings to the server 125. Additional, different, or fewer components may be provided in the server 125. FIG. 13 illustrates an example flowchart for the operation of server 125. Additional, different, or fewer acts may be provided.

At act S201, the processor 300 identifies a road segment in a geographic region that is associated with a charging station. The processor 300 may include a mapping module with an application specific module or processor that accesses a map for charging stations from a geographic database including data indicative of multiple road segments in a geographic region.

The mapping module is an example means for identifying a road segment associated with a charging station. The road segment with the charging station may be based on the geographic location received from one or more vehicles.

At act S203, the communication interface 305 or the processor 300 receives real time data related to the road segment and the charging station. The real time data may be a route received from a mobile device or a vehicle. The real time data may be multiple routes for a fleet of vehicles. The real time data may include a demand for energy for the fleet of vehicles, and the demand for energy is based on a quantity of the fleet of vehicles, at least one battery level associated with the fleet of vehicles, or a quantity of compatible vehicles in the plurality of vehicles.

At act S205, the processor 300, which may implement a lane charging management controller, generates a lane charging command for a charging device associated with the at least one the road segments in response to the real time data. The lane charging controller is an example of a means for generating a lane charging command for a charging device associated with the road segment in response to the real time data. The lane charging command may control operation of the charging station such as turning on the charging station, turning off the charging station, or setting a charge level of the charging station. The lane charging command may include a timing value for initially or subsequently applying any of these instruction at a particular time or a particular time interval. The lane charging command may be an instruction for the vehicle to initiate charging or move to a charging lane. The lane charging command may depend on the speed of the vehicle or an attribute of the road segment. The lane charging command may include a sequence of instructions that instruct the vehicle to collect the excess energy from the charging device, store the excess energy in a battery of the vehicle, and deliver the excess energy to a subsequent charging device.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, $5^{th}$ generation wireless systems, or another protocol.

The controller 210 and/or processor 300 may include a general processor, digital signal processor, an application specific integrated circuit (ASIC), field programmable gate array (FPGA), analog circuit, digital circuit, combinations thereof, or other now known or later developed processor. The controller 210 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 and 133 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes. The geographic data may include non-road transit nodes and routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion or a factor of an amount of congestion.

The input device 203 may be one or more buttons, keypad, keyboard, mouse, stylus pen, trackball, rocker switch, touch pad, voice recognition circuit, gesture control, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments the invention are also disclosed:

Embodiment 1

A method for implementing lane charging for a roadway, the method comprising:
  identifying a road segment in a geographic region;
  receiving real time data at a lane charging management device; and
  generating a lane charging command for a charging device associated with the road segment in response to the real time data.

Embodiment 2

The method of embodiment 1, wherein the real time data includes a route for a vehicle.

Embodiment 3

The method of embodiments 1-2, wherein the lane charging command is based on an attribute associated with the road segment.

Embodiment 4

The method of embodiments 1-3, wherein the attribute is a slope of the road segment, a banking of the road segment, or a curvature of the road segment.

Embodiment 5

The method of embodiments 1-4, wherein the real time data includes a plurality of routes for a plurality of vehicles, wherein the road segment is included in the plurality of routes.

Embodiment 6

The method of embodiments 1-5, wherein the real time data includes weather data associated with the road segment or traffic data associated with the road segment.

Embodiment 7

The method of embodiments 1-6, wherein the real time data includes a demand for energy for a plurality of vehicles, wherein the demand for energy is based on a quantity of the plurality of vehicles, at least one battery level associated with the plurality of vehicles, or a quantity of compatible vehicles in the plurality of vehicles.

Embodiment 8

The method of embodiments 1-7, further comprising: generating a vehicle charging command based on the real time data, wherein the vehicle charging command instructs a vehicle to store excess energy from the charging device.

Embodiment 9

The method of embodiments 1-8, wherein the vehicle is configured to collect the excess energy from the charging device, store the excess energy in a battery of the vehicle, and deliver the excess energy to a subsequent charging device.

Embodiment 10

The method of embodiments 1-9, wherein the lane charging command is included in a plurality of lane charging commands for a plurality of charging devices.

Embodiment 11

The method of embodiments 1-10, wherein the lane charging commands includes a timing value for the charging device that indicates when the charging device is activated.

Embodiment 12

The method of embodiments 1-11, wherein the lane charging commands includes a charging value for the charging device that indicates an operating level for the charging device.

Embodiment 13

The method of embodiments 1-12, wherein the operating level for the charging device is selected from a plurality of charging levels.

Embodiment 14

The method of embodiments 1-13, further comprising: receiving data indicative of a geographic position of a vehicle, wherein the road segment is identified based on the geographic position of the vehicle.

Embodiment 15

The method of embodiments 1-14, further comprising: querying a geographic database for the road segment; and receiving an identifier for the charging device from the geographic database.

Embodiment 16

An apparatus, configured to perform and/or control the method of any of embodiments 1-15 or comprising means for performing and/or controlling any of embodiments 1-15.

Embodiment 17

An apparatus, comprising at least one processor and at least one memory including computer program code for one or more programs, the at least one memory and the computer program code configured to, with the at least one processor, to perform and/or control the method of any of embodiments 1-15.

Embodiment 18

A computer program comprising instructions operable to cause a processor to perform and/or control the method of any of embodiments 1-15, when the computer program is executed on the processor.

We claim:

1. A method for implementing lane charging for a roadway, the method comprising:
    identifying a road segment in a geographic region;
    receiving real time data at a lane charging management device;
    identifying a selected lane for the road segment;
    receiving lane charging data for the selected lane that indicates whether the selected lane is a charging lane; and
    generating a lane charging command for a charging device for the selected lane of the road segment, the lane charging command generated in response to the identified road segment, the lane charging data, and the real time data.

2. The method of claim 1, wherein the real time data includes a route for a vehicle.

3. The method of claim 1, wherein the lane charging command is based on an attribute associated with the road segment.

4. The method of claim 3, wherein the attribute is a slope of the road segment, a banking of the road segment, or a curvature of the road segment.

5. The method of claim 1, wherein the real time data includes a plurality of routes for a plurality of vehicles, wherein the road segment is included in the plurality of routes.

6. The method of claim 1, wherein the real time data includes weather data associated with the road segment or traffic data associated with the road segment.

7. The method of claim 1, wherein the real time data includes a demand for energy for a plurality of vehicles, wherein the demand for energy is based on a quantity of the plurality of vehicles, at least one battery level associated with the plurality of vehicles, or a quantity of compatible vehicles in the plurality of vehicles.

8. The method of claim 1, further comprising:
generating a vehicle charging command based on the real time data, wherein the vehicle charging command instructs a vehicle to store excess energy from the charging device.

9. The method of claim 8, wherein the vehicle is configured to collect the excess energy from the charging device, store the excess energy in a battery of the vehicle, and deliver the excess energy to a subsequent charging device.

10. The method of claim 1, wherein the lane charging command is included in a plurality of lane charging commands for a plurality of charging devices.

11. The method of claim 1, wherein the lane charging command includes a timing value for the charging device that indicates when the charging device is activated.

12. The method of claim 1, wherein the lane charging command includes a charging value for the charging device that indicates an operating level for the charging device.

13. The method of claim 12, wherein the operating level for the charging device is selected from a plurality of charging levels.

14. The method of claim 1, further comprising:
receiving data indicative of a geographic position of a vehicle, wherein the road segment is identified based on the geographic position of the vehicle.

15. The method of claim 1, further comprising:
querying a geographic database for the road segment; and
receiving an identifier for the charging device from the geographic database.

16. An apparatus for implementing lane charging for a roadway, the apparatus comprising:
a geographic database including data indicative of a plurality of road segments in a geographic region;
a communication interface configured to receive real time data for at least one of the road segments in geographic region and lane charging data for a selected lane of the at least one of the road segments that indicates whether the selected lane is a charging lane; and
a lane charging management controller configured to generate a lane charging command for a charging device of the selected lane of the at least one of the road segments in response to the real time data and in response to the lane charging data.

17. The apparatus of claim 16, wherein the real time data includes a route for a vehicle and the lane charging command is based on an attribute associated with the road segment and stored in the geographic database.

18. The apparatus of claim 16, wherein the real time data includes a demand for energy for a plurality of vehicles, wherein the demand for energy is based on a quantity of the plurality of vehicles, at least one battery level associated with the plurality of vehicles, or a quantity of compatible vehicles in the plurality of vehicles.

19. The apparatus of claim 17, wherein the lane charging management controller is configured to generate a vehicle charging command based on the real time data, wherein the vehicle is configured to collect the excess energy from the charging device, store the excess energy in a battery of the vehicle, and deliver the excess energy to a subsequent charging device or subsequent location.

20. A system for implementing lane charging for a roadway, the system comprising:
a charging device integrated with a road surface;
a geographic database including data indicative of a plurality of road segments in a geographic region, including a road segment associated with the road surface of the charging device; and
a lane charging management device configured to receive real time data for at least one of the road segments in the geographic region, identify a selected lane for the at least one of the road segments based on the real time data, receive lane charging data for the selected lane that indicates whether the selected lane is a charging lane, and generate a lane charging command for the charging device associated with the road segment in response to the real time data.

* * * * *